W. HAYWARD.
WINDMILL.
APPLICATION FILED JUNE 11, 1909.

1,101,543.

Patented June 30, 1914.
4 SHEETS—SHEET 1.

Witnesses.
Inventor.

W. HAYWARD.
WINDMILL.
APPLICATION FILED JUNE 11, 1909.

1,101,543.

Patented June 30, 1914.
4 SHEETS—SHEET 3.

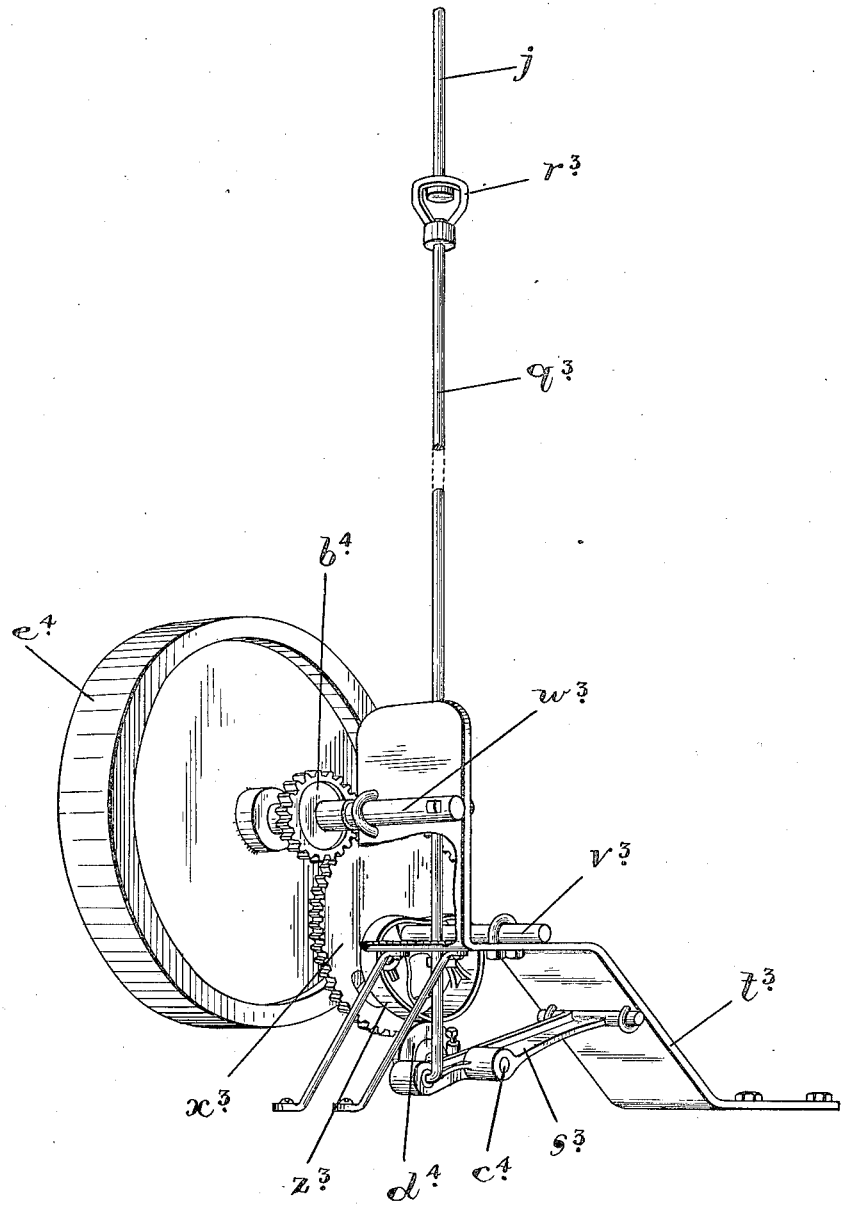

UNITED STATES PATENT OFFICE.

WALTER HAYWARD, OF WOODSTOCK, ONTARIO, CANADA.

WINDMILL.

1,101,543.  Specification of Letters Patent.  Patented June 30, 1914.

Application filed June 11, 1909. Serial No. 501,563.

*To all whom it may concern:*

Be it known that I, WALTER HAYWARD, of the city of Woodstock, in the county of Oxford and Province of Ontario, Canada, have invented certain new and useful Improvements in Windmills; and I hereby declare that the following is a full, clear, and exact description of the same.

This invention relates to a wind mill so constructed that the wind wheel can, if necessary, start its revolution with a low wind pressure and attain momentum before the maximum load of the reciprocating rod is transmitted to it, this being attained by pivotally connecting the reciprocating rod to a lifting lever fulcrumed to the main frame of the wind mill and provided with an idler engaging with the working surface of a heart shaped lifting cam rotated during the revolution of the wind wheel and so arranged that the indented part of its working surface will receive the idler when the parts are in a state of rest, the indented part being adjacent to the center around which the cam revolves to move at a comparatively slow rate of speed and enable the wind wheel to attain momentum before the faster moving part of the working surface receives the load of the reciprocating rod.

For an understanding of the invention reference is to be had to the following description and to the accompanying drawings in which:—

Figure 1:
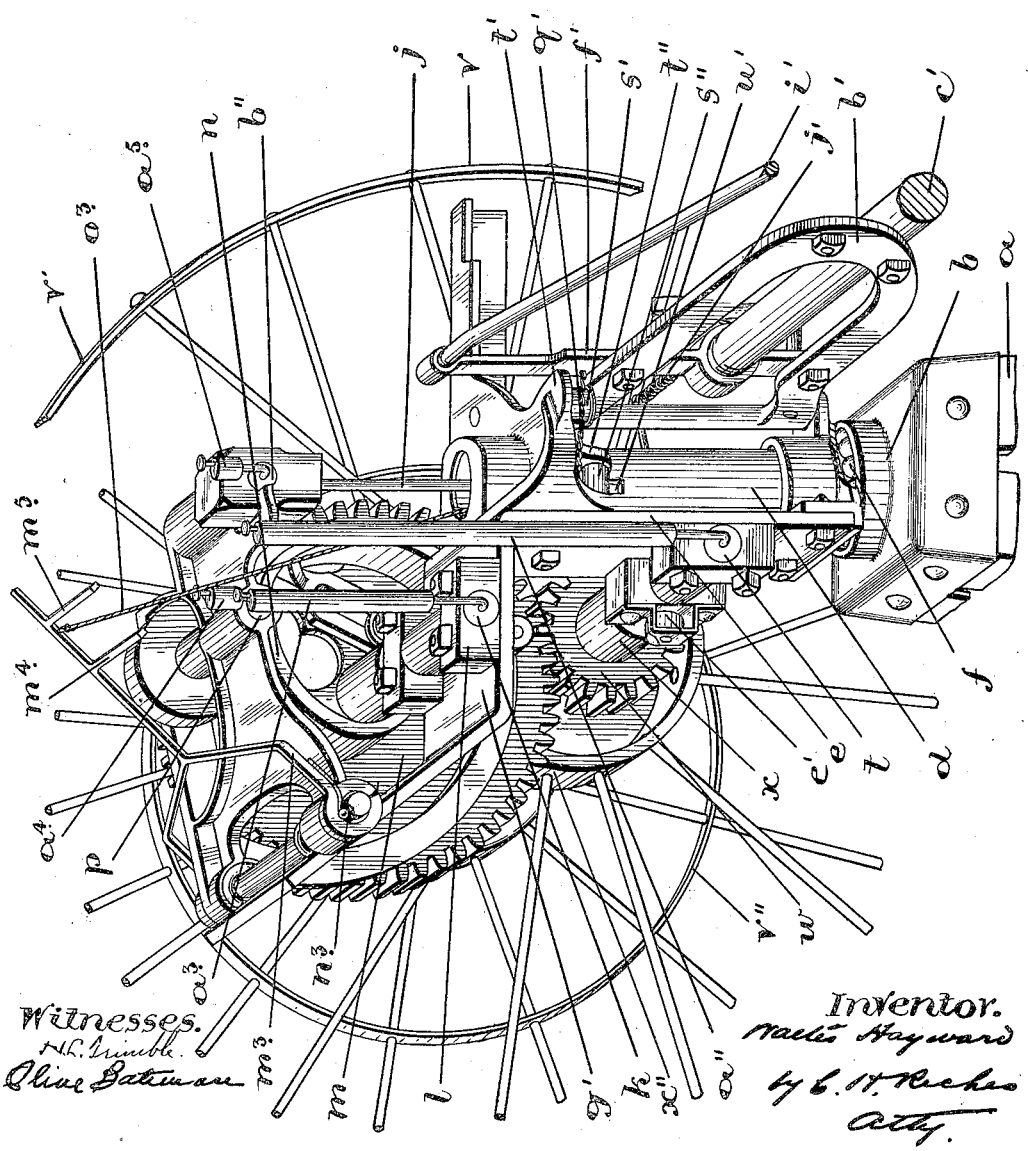
Figure 2:
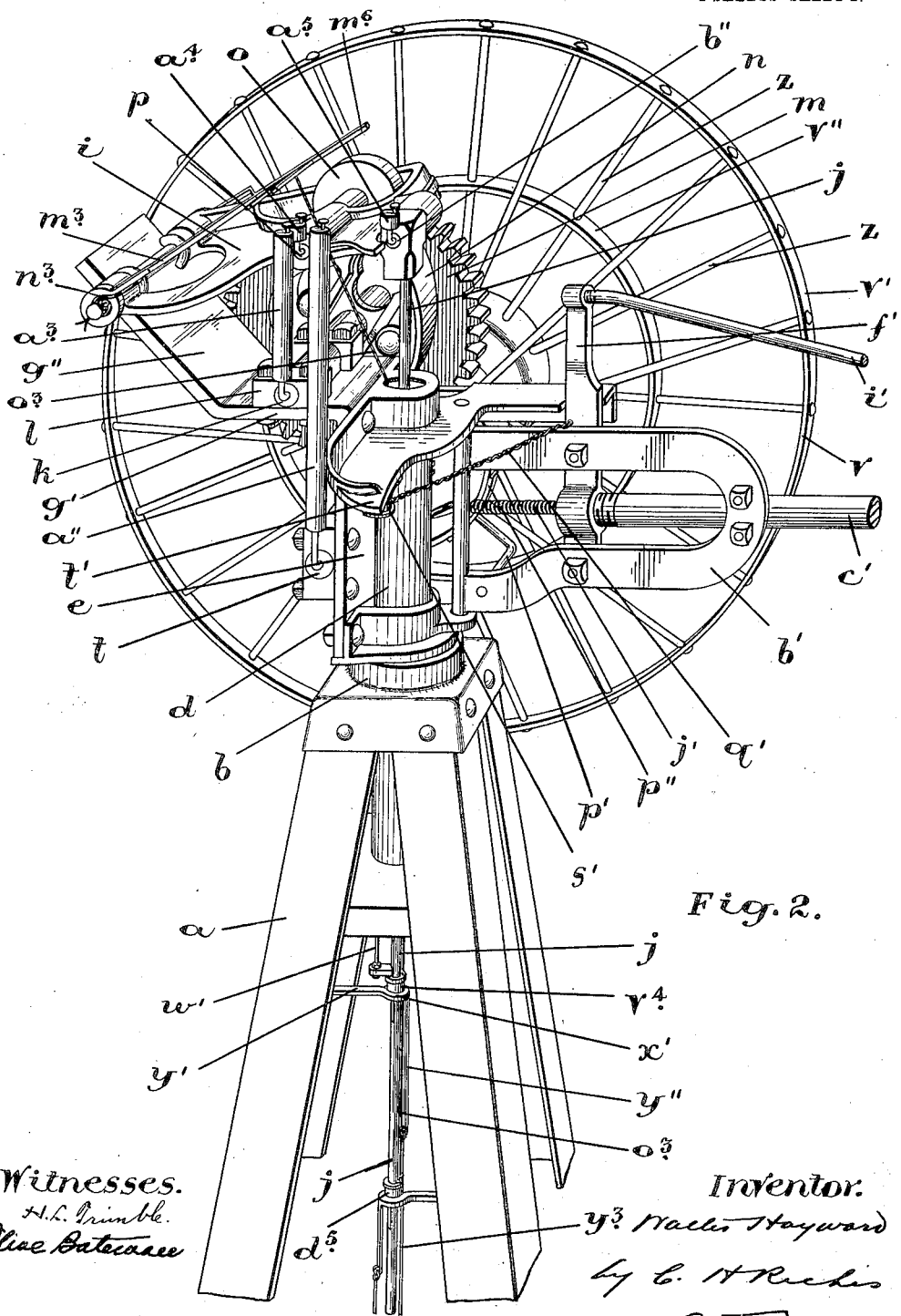
Figure 3:
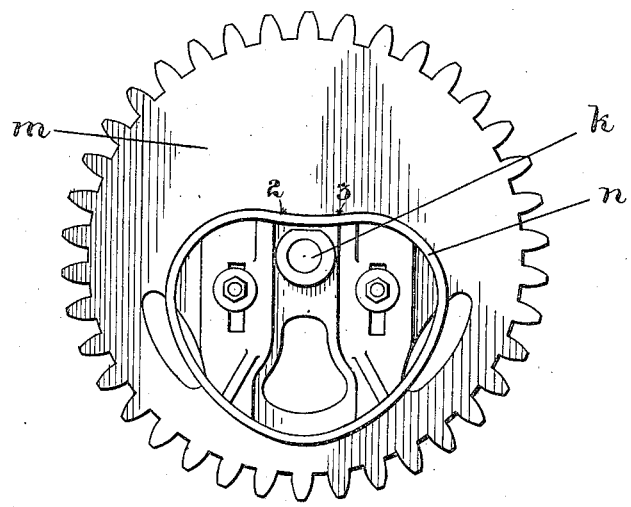
Figure 4:
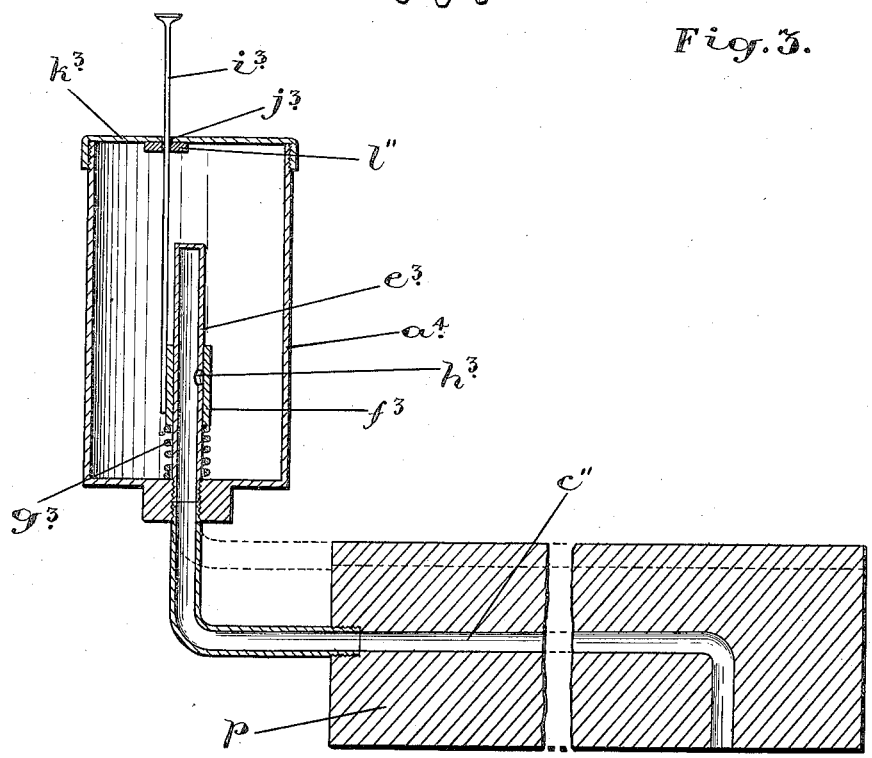

Figure 1, is a perspective view of the working parts of a wind mill in operative relation. Fig. 2, is a similar view to Fig. 1, with the working parts in inoperative relation. Fig. 3, is a side elevation of the heart shaped cam showing it adjustably attached to a spur wheel. Fig. 4, is a vertical section of the oiling device, and, Fig. 5, is a view of the mechanism for converting the motion of the reciprocating rod into rotary motion.

Like characters of reference refer to like parts throughout the specification and drawings.

The mast or tower $a$ is provided with a centrally apertured turn table $b$ revolubly holding the sleeve $d$ forming part of the main frame $e$, antifriction bearings $f$ being interposed between the turn table and flange of the sleeve for the free revolution of the main frame. The main frame $e$, at one side of the sleeve, is provided with an extension, consisting of a horizontal part $g'$ and an inclined part $g''$ to which is fulcrumed a lifting lever $i$, the latter being pivotally connected to the reciprocating rod operating in the sleeve $d$. The lifting lever $i$ is provided with an idler $o$ engaging with the working face of a heart shaped cam $n$ adjustably attached to the side face of the gear wheel $m$ mounted on the shaft $k$, the shaft $k$ being attached by a clip $l$ or the like to the horizontal part $g'$ of the main frame, the adjustment of the heart shaped cam providing for variations in the length of the stroke of the reciprocating rod to the working requirements of the wind mill. The gear wheel $m$ meshes with a pinion $w$ mounted on the hub $x$ of the wind wheel $v$, the wind wheel being mounted on a shaft $t$ attached to the main frame $e$.

The wind wheel during its revolution, through the intermeshing of the pinion $w$ and gear wheel $m$, rotates the heart shaped cam $n$ to effect the reciprocation of the rod $j$ through the agency of the lever $i$ and idler $o$. The cam $n$, as shown in Fig. 3, of the drawings, is placed with the indented part adjacent to the hub and the apex adjacent to the rim of the gear wheel, so that when the parts of the wind wheel are coming to a state of inertia, the idler $o$ will seek out the indented part of the cam until the wind pressure is sufficient to set the wind wheel again in motion. Thus when the parts of the windmill are at rest, the idler lever and reciprocating rod are all in their lower position.

When the wind is of sufficient force to actuate the wind wheel, the gear wheel $m$ revolves and raises the cam $n$ to lift the reciprocating rod. The indented part of the cam being adjacent to the center of the gear wheel moves at a slower rate of speed than the apex, or that part of the working surface between the apex and the indented part, and consequently requires less power to lift the reciprocating rod than is required when the idler reaches the apex or any intermediate place between the apex and the indented part of the working surface, thus the wind wheel is able to start with a low wind pressure, and attain sufficient momentum to offset the weight of the load of the reciprocating rod before the faster moving part of the working surface of the cam engages with the idler. To attain this momentum the ratio of the gear wheel $m$ and pinion $w$ is such that the wind wheel will accomplish one or more revolutions while the idler $o$ is moving from the place marked 2 to that marked 3 on the cam. The wind wheel is provided with a band $v''$ intermediate the rim $v'$ and the hub, alternate spokes $z$ passing through the band holding it in place. The pressure of the wind against the wind wheel $v$ develops more or less end thrust which is received by an idler $e'$ revolubly connected to the main frame and contacting the hub $x$ of the wind wheel.

A spring tensioned vane bracket $b'$ is hinged to the main frame, so as to swing into a plane either parallel with, or at right angles, to the plane of the wind wheel, the vane bracket being limited in its motion in one direction by the main frame $e$, and in the other direction by the engagement of the brake shoe with the hub of the wind wheel. A post $f'$ is rigidly attached to the vane bracket and in conjunction with the latter rigidly holds a vane arm $c'$, a stay $i'$ being attached to the post and to the vane arm to brace the latter.

Attached to the vane bracket $b'$ is the brake arm $p'$ securely holding the brake shoe $p''$ which engages with the hub $x$ of the wind wheel $v$, the vane bracket, vane arm, and parts carried thereby moving into the position shown in Fig. 2, under the influence of the spring $j'$ to force the brake shoe into contact with the hub of the wind wheel as hereinafter described. The vane arm $c'$ is moved into the position shown in Fig. 1, by a cord or chain $q'$ attached to the vane bracket or post $f'$, and passing around the sheaves $s'$ and $s''$ revoluble in brackets $t'$ and $t''$ respectively, the chain $q'$ passing through a slot $u'$ in the sleeve $d$, into the interior of the latter and being attached to a rod $w'$ which has at its lower end a tube $v^4$ surrounding the reciprocating rod $j$. The tube $v^4$ is adapted to slide longitudinally on and turn with the reciprocating rod $j$ and swiveled on the tube $v^4$ is a collar $x'$ having a substantially horizontal arm $y'$ to engage with the tower $a$ and prevent the collar $x'$ turning with the tube, the collar being provided with a substantially vertical arm $y''$ to which is attached a cord $y^3$, or the like, operable from any desired position by which the vane arm $c'$ is moved into the position shown in Fig. 1. By the above means, the cord $y^3$ is prevented from winding around the reciprocating rod $j$ as the latter turns with the main frame $e$ and parts carried thereby, when the direction of the wind changes. Upon releasing the cord $y^3$ the spring $j'$ causes the vane arm to return to the position shown in Fig. 2, and apply the brake shoe $p''$ to the hub of the wind wheel.

To provide for the lubrication of the wind mill parts, oil cups $a''$, $a^3$, $a^4$ and $a^5$ are secured to the fixed ends of the shafts $t$, $k$, $p$, and the pivotal connections $b''$ for the reciprocating rod $j$ and lever $i$ respectively, and each of the said shafts, and each pivotal connection is provided with an oil duct $c''$ leading to the bearing surface of the shaft. In each oil cup is an upright oil tube $e^3$, closed at its upper end and having its bore registering with the oil duct $c''$. Surrounding the oil tube $e^3$ and adapted to slide thereon, is the sleeve $f^3$ held normally in position by a coiled spring $g^3$ or the like, to close the aperture $h^3$ leading to the interior of the oil tube $e^3$. The operating rod $i^3$ is rigidly attached to the sleeve $f^3$ and passes through an aperture $j^3$ in the cover $k^3$ of the oil cup, and limiting the action of the operating rod $i^3$ is a stop $l$ engaging with the inner side of the cover $k^3$. The lever $m^3$, pivotally connected to the part $g''$ of the main frame, is normally held in a raised position by a weight or spring $n^3$, and carried by the lever $m^3$ are fingers $m^4$ and $m^5$ which, as the lever $m^3$ descends, engages the ends of the operating rods of the oil cups, the fingers $m^4$ being so constructed as to contact the operating rods of the oil cups $a^3$ and $a^4$, and the finger $m^5$ contacting the operating rods of the coil cups $a''$ and $a^5$. The operation of the lever $m^3$ is controlled by a wire or cord $o^3$ attached to the lever near its free end and passing through the interior of the sleeve $d$ to a device $d^5$ similar to the tube $v^4$ and collar $x'$ as above described, to prevent the cord $o^3$ becoming wound around the reciprocating rod $j$, the operation of the cord $o^3$ being controlled from the ground or other convenient position as desired.

When the cord $o^3$ is operated to draw the lever $m^3$ down against the ends of the operating rods $i^3$ of the oil cups, the sleeves $f^3$ of the latter are forced downward against the action of the springs $g^3$ to allow the oil to pass from the chambers of the oil cups through the apertures $h^3$ in the oil tubes $e^3$ and the oil ducts $c''$ to the bearing surfaces of the shafts. The operation of oiling manually from the ground by pulling the lever $m^3$ is designed to be done while the mill is inoperative as then the arms carrying the oil cups rests always at the lowest level and the oil cup will always be in the proper position for the lever contacting it. If desired, the lubrication of the parts may be accomplished automatically by drawing the lever $m^3$ partly down and securing the cord $o^3$ to hold the lever in that position, and arranging the length of the operating rods $i^3$ of the oil cups $a''$ and $a^3$ to be operated when the lever $m^3$ is in that position, and by arranging the length of the operating rods $i^3$ of the oil cups $a^4$ and $a^5$ to be operated by the arms of the lever $m^3$ for each reciprocation of the lever $i$. With this latter form of construction, the apertures $j^3$ in the oil tubes $e^3$ of the oil cups will be smaller than when the oil cups are manually operated, to limit the quantity of oil passing to the lubricated surfaces.

When it is desired to use the wind mill for pumping, the reciprocating rod $j$ may be attached to a pump rod, but when it is desired to convert the reciprocating motion into rotary motion, the reciprocating rod is connected to the rod $q^3$ by a swivel $r^3$ to permit of the turning of the reciprocating rod $j$. The rod $q^3$ is pivotally connected at its lower end to the free end of the lever $s^3$ which has its other end pivotally held by the arms of the frame $t^3$ vertically below the rod $j$, the frame $t^3$ being substantially similar to the frame $e$ and in an inverted position to the frame $e$. The frame $t^3$ may be secured to the tower $a$, or attached to the flooring upon which the tower stands, and carried by the frame $t^3$ are the shafts $v^3$ and $w^3$ upon which are mounted the gear wheel $x^3$ carrying the cam $z^3$, and the pinion $b^4$ meshing with the gear wheel $x^3$ respectively, similar to the shafts $k$ and $t$ and gear wheel $m$ and pinion $w$. The lever $s^3$ carries a shaft $c^4$ upon which revolves the idler $d^4$ to revolubly contact the cam $z^3$, and revoluble with the pinion $b^4$ is a heavy fly wheel $e^4$. The apex of the cam $z^3$ is similarly positioned to the apex of the cam $n$ with respect to the rim and center of the gear wheel, and as the cam $n$ revolves, as hereinafter described, to reciprocate the reciprocating rod $j$ the idler $d^4$ will be actuated to raise the apex of the cam $z^3$ and impart a rotary motion to it, the momentum of the fly wheel $e^4$ carrying the cam $z^3$ past its dead center. If desired, the pinion $b^4$ and gear wheel $x^3$ may be dispensed with, and the fly wheel $e^4$ may be mounted upon the shaft $v^3$ and provided with a cam $z^3$, the cam $z^3$ engaging with the idler $d^4$ as before described. If a high speed is desired, the pinion $w$ and gear wheel $m$ may be dispensed with and the wind wheel $v$ mounted on the shaft $k$, in which case the hub of the wind wheel would be arranged to carry the cam $n$ to operate with the idler $o$.

I do not wish to be confined to the specific construction herein described, as it can be altered without departing from the nature of the invention.

Having thus fully described my invention what I claim as new and desire to secure by Letters Patent is:

In a windmill, a rotatable main frame having a lateral extension, a lifting lever fulcrumed thereto, a pump rod pivotally connected to the lifting lever, a shaft, a gear wheel mounted thereon, a heartcam attached to the gear wheel and actuating the lifting lever, a wind wheel, and a pinion mounted on the hub of said wind wheel and meshing with said gear wheel to effect the rotation of said heart cam during the revolution of the wind wheel.

London, 3 June, 1909.

WALTER HAYWARD.

Signed in the presence of—
E. H. CROSS,
J. F. GOWING.

---

Copies of this patent may be obtained for five cents each, by addressing the "Commissioner of Patents, Washington, D. C."